United States Patent [19]

Hollweck

[11] 4,109,225
[45] Aug. 22, 1978

[54] TEMPERATURE REGULATOR AND SAFETY THERMOSTAT

[75] Inventor: Walter Hollweck, Nuremberg, Fed. Rep. of Germany

[73] Assignee: Inter Control Hermann Köhler Elektrik GmbH & Co. KG, Nuremberg, Fed. Rep. of Germany

[21] Appl. No.: 731,749

[22] Filed: Oct. 12, 1976

[30] Foreign Application Priority Data

Oct. 16, 1975 [DE] Fed. Rep. of Germany ....... 2546274

[51] Int. Cl.² ............................................. H01H 71/16
[52] U.S. Cl. ....................................... 337/42; 337/338
[58] Field of Search ............... 337/333, 334, 335, 336, 337/337, 338, 360, 372, 42

[56] References Cited

U.S. PATENT DOCUMENTS

| | | |
|---|---|---|
| 3,184,571 | 5/1965 | Broekhuysen ...................... 337/336 |
| 3,913,048 | 10/1975 | Mertler ............................ 337/360 X |
| 3,973,232 | 8/1976 | Hickling .......................... 337/360 X |

*Primary Examiner*—George Harris
*Attorney, Agent, or Firm*—Spencer & Kaye

[57] ABSTRACT

A temperature regulator and safety thermostat assembly includes a heat conducting base plate which forms part of the safety thermostat and which has an extension projecting beyond the safety thermostat. A rivet passes through the extension for holding together components of the temperature regulator and securing them to the base plate.

3 Claims, 3 Drawing Figures

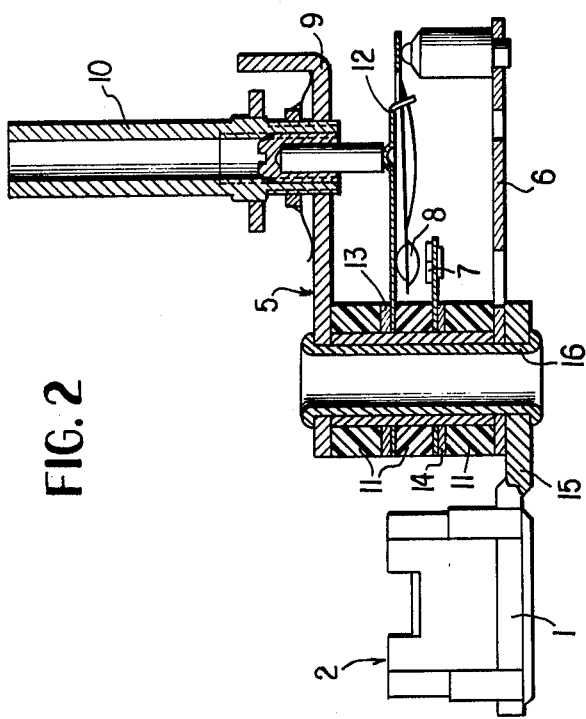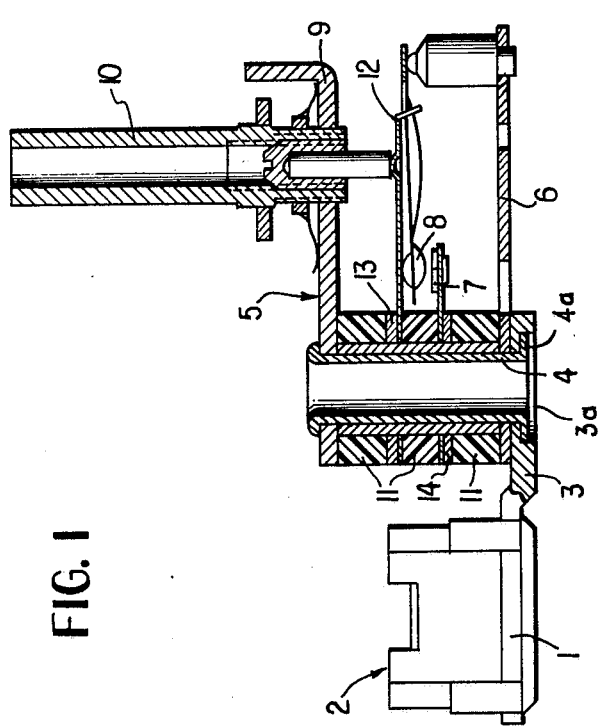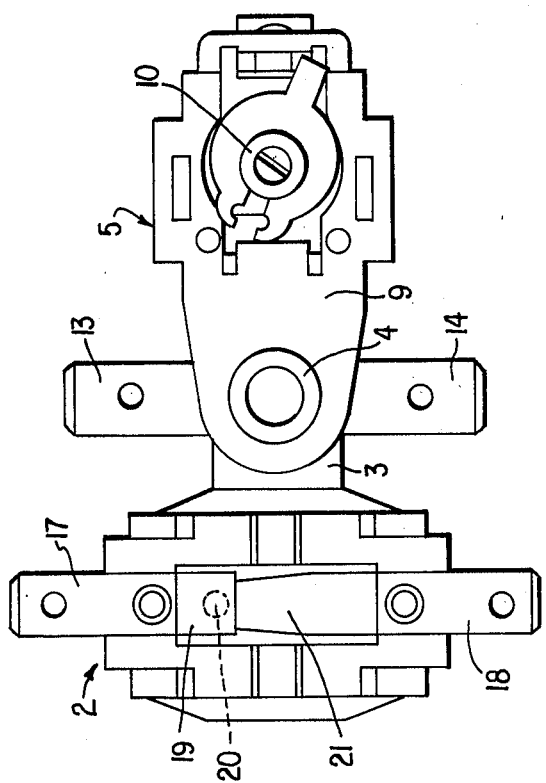

TEMPERATURE REGULATOR AND SAFETY THERMOSTAT

BACKGROUND OF THE INVENTION

This invention relates to a combination of a temperature regulator, preferably of the bimetallic type which comprises electric contacts, electric terminals, a desired value setting device, with a safety thermostat such as a temperature regulator, temperature monitor or temperature limiter which preferably comprises a housing with switch contacts and electric terminals and a bimetallic disc which is arranged between the housing and a base plate and which has a force transmitting pin.

The above-outlined combination is preferably used in frying appliances or other electric appliances in which it is expedient to provide, in addition to a temperature regulator which may be set to a desired temperature value, a safety thermostat to eliminate fire hazard in case the temperature regulator breaks down.

Heretofore it has been conventional to incorporate in an appliance, in addition to the temperature regulator, a separately-mounted safety thermostat, such as a melting fuse or a temperature limiter. A melting fuse, however, has the disadvantage that its accuracy of response is not satisfactory. A separately-mounted temperature limiter is, on the one hand, too expensive and, on the other hand, insufficiently accurate since its location is not identical with that of the temperature regulator.

Further, it is known to combine a temperature regulator with a melting fuse in which the components of both the temperature and the melting fuse are held together by a common securing rivet. Since, however, the maximum operational temperature of oil or grease and the temperature to which the melting fuse responds and which is below the igniting temperature, are very close to one another, the spring-biased melting fuse (solder) is liable to gradually lose its solid consistency and eventually open the electric circuit.

SUMMARY OF THE INVENTION

It is an object of the invention to provide a combination of a temperature regulator and safety thermostat from which the above-discussed disadvantages are eliminated, which is economical to manufacture and which operates in an accurate manner.

These objects and others to become apparent as the specification progresses, are accomplished by the invention, according to which, briefly stated, the safety thermostat has a heat conducting base plate provided with a lateral extension in which there is arranged a rivet which holds together the individual components of the temperature regulator.

An advantage of the arrangement according to the invention resides in that the base plate of the safety thermostat and the bimetal of the temperature regulator are arranged on top of one another and thus have uniform heat contact with the surface to be monitored. The determination of the safe temperature may thus be effected with more generous tolerances than in case of a separate arrangement of temperature regulator and safety thermostat, resulting in a significant simplification of manufacture.

According to a feature of the invention, the rivet is fixedly supported in the base plate by virtue of a press fit.

According to a further feature of the invention, the connecting rivet is not fixedly attached to the base plate; the base plate is merely riveted to the individual components of the temperature regulator. The flange of the rivet which projects from the underside of the base plate, is then, during assembly, recessed into an opening so that the base plate has good heat conducting properties with respect to a contacting surface.

BRIEF DESCRIPTION OF THE DRAWINGS

FIG. 1 is a cross-sectional view of a preferred embodiment of the invention.

FIG. 2 is cross-sectional view of another preferred embodiment of the invention.

FIG. 3 is a top plan view of either embodiment.

DESCRIPTION OF THE PREFERRED EMBODIMENTS

Turning first to FIG. 1 there is shown a base plate 1 which has good heat conducting properties and which forms part of a safety thermostat 2. The base plate 1 has an extension 3 in which a rivet 4 is firmly secured, for example, by press-fitting its flange 4a in a countersunk recess 3a of the extension 3. The rivet 4 holds together the individual components of the temperature regulator 5 which comprises a bimetal 6, contacts 7 and 8, a temperature setting plate 9 having a desired value adjustor 10, insulating parts 11, a snap spring 1 as well as electric terminals 13 and 14.

Turning now to FIG. 2, the embodiment shown therein, contrary to the embodiment illustrated in FIG. 1, has a rivet 16 which is not firmly held in the base plate 1, but only holds the individual components of the temperature regulator 5 to the extension 15 of the base plate 1 of the safety thermostat 2.

FIG. 3 shows a top plan view of the combination according to the invention. From this Figure it is well seen that the safety thermostat 2 has electric contacts 17 and 18 as well as a contact 20 fixedly arranged on a contact carrier 19 and a movable spring 21 associated with a movable counter contact, not shown. Further, FIG. 3 shows a preferred arrangement of the terminals 13 and 14 of the temperature regulator 5.

It will be understood that the above description of the present invention is susceptible to various modifications, changes and adaptations, and the same are intended to be comprehended within the meaning and range of equivalents of the appended claims.

What is claimed is:

1. In an assembly including a temperature regulator sensing the temperature to be regulated and controlling an electric current flow therethrough as a function of the sensed temperature and a safety thermostat interrupting the current flow independently of the operation of the temperature regulator upon sensing a predetermined temperature; the safety thermostat having a heat conducting baseplate; the improvement comprising a heat conducting means for mechanically connecting said temperature regulator and said safety thermostat with one another into a unitary structure and for simultaneously supplying the heat to be sensed to said temperature regulator and said safety thermostat; said heat conducting means including a member constituting an extension of said baseplate and projecting beyond said safety thermostat and a rivet passing through said extension and holding together components of said temperature regulator; first movable contact means connected to and forming part of said temperature regulator and second movable contact means connected to and forming part of said safety thermostat; said first and second movable contact means being structurally separate from said safety thermostat and said temperature regulator, respectively.

2. An assembly as defined in claim 1, wherein said rivet is rigidly held in said extension.

3. An assembly as defined in claim 2, wherein said extension has a countersunk opening and said rivet has a flange recessed into said countersunk opening.

* * * * *